(12) United States Patent
Advani (10) Patent No.: US 9,299,246 B2
(45) Date of Patent: Mar. 29, 2016

(54) REPORTING RESULTS OF PROCESSING OF CONTINUOUS EVENT STREAMS

(71) Applicant: Oracle International Corporation, Redwood Shores, CA (US)

(72) Inventor: Pavan Advani, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 12 days.

(21) Appl. No.: 14/335,879

(22) Filed: Jul. 19, 2014

(65) Prior Publication Data

US 2016/0019776 A1 Jan. 21, 2016

(51) Int. Cl.
*G08B 29/00* (2006.01)
*G08B 25/00* (2006.01)
*G08B 29/02* (2006.01)

(52) U.S. Cl.
CPC .............. *G08B 29/02* (2013.01); *G08B 25/001* (2013.01)

(58) Field of Classification Search
CPC .... G08B 25/00; G08B 25/001; G08B 25/002; G08B 25/008; G08B 25/009; G08B 25/10; G08B 29/00; G08B 29/02; G08B 29/18; G08B 29/26
USPC ............... 340/500, 506, 521, 526, 531, 573.1
See application file for complete search history.

(56) References Cited

U.S. PATENT DOCUMENTS

| 5,339,392 | A | | 8/1994 | Risberg et al. |
|---|---|---|---|---|
| 5,499,196 | A | * | 3/1996 | Pacheco ............... G08B 26/008 702/81 |
| 6,040,770 | A | * | 3/2000 | Britton ................. G08B 25/004 340/506 |
| 6,408,404 | B1 | | 6/2002 | Ladwig |
| 6,975,220 | B1 | * | 12/2005 | Foodman ............ G06F 17/3089 340/506 |
| 7,262,690 | B2 | | 8/2007 | Heaton et al. |
| 7,512,098 | B2 | | 3/2009 | Jiang et al. |
| 7,783,500 | B2 | * | 8/2010 | Meyer ..................... G06Q 10/06 705/1.1 |

(Continued)

FOREIGN PATENT DOCUMENTS

| EP | 0813716 B1 | 3/2003 |
|---|---|---|
| EP | 2426655 A1 | 3/2012 |

OTHER PUBLICATIONS

Automatic Alarms from any system Critical Wireless Alarm System, http://www.hiplink.com/index.php?option=com_content&view=article&id=9&Itemid=10, Downloaded circa Jan. 6, 2014, pp. 1-1.

(Continued)

*Primary Examiner* — Hung T Nguyen
(74) *Attorney, Agent, or Firm* — IPHorizons PLLC; Narendra Reddy Thappeta (57) ABSTRACT

An aspect of the present disclosure facilitates reporting results of processing of continuous event streams. In one embodiment, a matching condition indicating a pattern of interest as a part of an alert definition in relation to a set of continuous event streams is received, with the occurrences of said pattern of interest being desirable to be reported as corresponding alert instances. Also, a suppression condition associated with the pattern of interest is received, with the suppression condition indicating the specific occurrences of the pattern of interest that are not to be reported as corresponding alert instances. Accordingly, a sequence of occurrences of the pattern of interest is determined in the set of continuous event streams. For each occurrence in the sequence of occurrences, an alert instance corresponding to the occurrence is generated only if the suppression condition is not satisfied for the occurrence.

20 Claims, 7 Drawing Sheets

(56) References Cited

U.S. PATENT DOCUMENTS

| | | | |
|---|---|---|---|
| 2003/0028884 A1 | 2/2003 | Swart et al. | |
| 2009/0201162 A1* | 8/2009 | Barth | G08B 21/20 340/605 |
| 2009/0288166 A1 | 11/2009 | Brown et al. | |
| 2010/0099461 A1 | 4/2010 | Rahfaldt et al. | |
| 2010/0122334 A1 | 5/2010 | Stanzione et al. | |
| 2011/0202544 A1 | 8/2011 | Carle et al. | |
| 2013/0040610 A1 | 2/2013 | Migicovsky et al. | |
| 2013/0063264 A1* | 3/2013 | Oktem | G05B 23/024 340/540 |
| 2013/0133055 A1 | 5/2013 | Ali et al. | |

OTHER PUBLICATIONS

Ignacio Aedo , Shuxin Yu, Paloma Díaz, Pablo Acuña and Teresa Onorati, Personalized Alert Notifications and Evacuation Routes in Indoor Environments, http://ip.com/pdf/pmc/PMC3436002.pdf, Sensors 2012, 12, 7804-7827; doi:10.3390/s120607804, date Jun. 8, 2012, pp. 1-24, ISSN 1424-8220.

User Guide for Cisco Network Analysis Module Traffic Analyzer, 5, http://www.cisco.com/en/US/docs/net_mgmt/network_analysis_module_software/5.0/user/guide/setup.html, Downloaded circa Jan. 6, 2014, pp. 1-41.

Arvind Arasu and Shivnath Babu and Jennifer Widom, The CQL Continuous Query Language: Semantic Foundations and Query Execution, The VLDB Journal—The International Journal on Very Large Data Bases, Date Jun. 2006, pp. 121-142, vol. 15 Issue 2.

Arvind Arasu, Brian Babcock, Shivnath Babu, John Cieslewicz, Mayur Datar, Keith Ito, Rajeev Motwani, Utkarsh Srivastava, and Jennifer Widom, Stream: The Stanford Data Stream Management System, date 2004, pp. 1-21.

* cited by examiner

| | Time (t) 521 | Activity 522 | Region 523 | In window (w) 524 | In Queue 525 | User 1 Alert 526 | User 2 Alert 527 |
|---|---|---|---|---|---|---|---|
| 541 | 12 Jun 15:40 | ? | South | 12 Jun 15:30-15:45 | Yes | Send | Send |
| 542 | 12 Jun 15:40 | ? | East | 12 Jun 15:30-15:45 | NO | Send | Send |
| 543 | 14 Jun 6:05 | ? | South | 14 Jun 6:00-6:15 | Yes | Send | Send |
| 544 | 15 Jun 19:05 | ? | North | 15 Jun 19:00-19:15 | NO | Send | Send |
| 545 | 16 Jun 10:10 | ? | South | 16 Jun 10:00-10:15 | Yes | Send | Send |
| 546 | 16 Jun 10:20 | ? | South | 16 Jun 10:15-10:30 | Yes | Send | Send |
| 547 | 16 Jun 10:40 | ? | South | 16 Jun 10:30-10:45 | Yes | Send | Send |
| 548 | 16 Jun 10:45 | ? | South | 16 Jun 10:30-10:45 | Yes | Send | Send |
| 549 | 16 Jun 10:50 | ? | South | 16 Jun 10:45-11:00 | Yes | Skip | Send |
| 550 | 16 Jun 11:25 | ? | South | 16 Jun 11:15-11:30 | Yes | Skip | Send |
| 551 | 16 Jun 15:05 | ? | South | 16 Jun 15:00-15:15 | Yes | Skip | Skip |
| 552 | 16 Jun 18:35 | ? | South | 16 Jun 18:30-18:45 | Yes | Send | Skip |
| 553 | 16 Jun 22:55 | ? | South | 16 Jun 22:45-23:00 | Yes | Send | Send |
| 554 | 17 Jun 01:10 | ? | South | 17 Jun 01:00-01:15 | Yes | | |

REPORTING RESULTS OF PROCESSING OF CONTINUOUS EVENT STREAMS

BACKGROUND OF THE DISCLOSURE

1. Technical Field

The present disclosure relates generally to processing of continuous event streams, and more specifically to reporting results of processing of continuous event streams.

2. Related Art

In traditional database systems, data is stored in one or more databases usually in the form of tables. The stored data is then queried and manipulated using a data management language such as SQL (structured query language). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), click-stream analysis tools, automobile traffic monitoring, and the like. For example, a temperature sensor may be configured to send out temperature readings.

Processing of continuous event streams necessarily entails specifying a moving time window along with selection criteria in a query. The selection criteria is applied against data values corresponding to time instances in a specific duration determined by the moving time window to form the results corresponding to that duration. The results are formed at continuous discrete instances as the specific duration is changed according to the moving time window specified in the query.

For example, the moving time window may be specified as (3 minutes width and 2 minutes slide starting at t=3), implying that the results may need to be formed for the events corresponding to the respective durations 0-3, 2-5, 4-7, 6-9, etc. Continuous Query Language (CQL) is an example of a language used for specifying queries for continuous event streams.

It is often desirable that the results of processing of continuous event streams be reported to one or more users. Reporting generally implies making available the corresponding information of interest, based on the results.

Aspects of the present disclosure provide for reporting results of processing of continuous event streams.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure facilitates reporting results of processing of continuous event streams. In one embodiment, a matching condition indicating a pattern of interest as a part of an alert definition in relation to a set of continuous event streams is received, with the occurrences of the pattern of interest being desirable to be reported as corresponding alert instances. Also, a suppression condition associated with the pattern of interest is received, with the suppression condition indicating the specific occurrences of the pattern of interest that are not to be reported as corresponding alert instances. Accordingly, a sequence of occurrences of the pattern of interest is determined in the set of continuous event streams. For each occurrence in the sequence of occurrences, an alert instance corresponding to the occurrence is generated only if the suppression condition is not satisfied for the occurrence.

In one embodiment, the determination of the sequence of occurrences (noted above) is performed by obtaining a sequence of results of execution of a continuous query on the set of continuous event streams. The continuous query may be specified according to CQL (continuous query language). The continuous query indicates a selection criteria corresponding to the matching condition (specified in the alert definition) and a moving time window. Each of the sequence of results is obtained based on data values of the set of continuous event streams in a corresponding duration determined by the moving time window. The sequence of results is identified as corresponding to the sequence of occurrences of the pattern of interest in the set of continuous event streams. Accordingly, the alert instances corresponding to each result is generated only if the suppression condition is not satisfied for the result. On the other hand, the alert instance corresponding to a result is skipped if the suppression condition is satisfied for the result.

According to another aspect of the present disclosure, the suppression condition (in the alert definition) specifies a timing pattern for prior alert instances and a suppression duration. Accordingly, the alert instance for an occurrence (of the pattern of interest) is skipped if the timing of the alert instances prior to the occurrence satisfies the timing pattern and the timing of the occurrence is within the suppression duration.

In one embodiment, the timing pattern is specified in the form of a threshold number (e.g., in the form of absolute number, average, etc.) of prior alert instances in a prior duration, wherein subsequent alert instances are suppressed for the suppression duration upon generation of the threshold number of prior alert instances in the prior duration thereby avoiding repetition of the alert instances beyond the threshold number in a duration of a sum of the prior duration and the suppression duration.

According to one more aspect of the present disclosure, the alert definition indicates that alert instances are to be sent to a first user and a second user, while the suppression condition is specified associated with the second user but not the first user. Accordingly, for each occurrence (of the pattern of interest) determined within the suppression duration, the corresponding alert instance is sent to the first user, but is skipped for the second user.

According to yet another aspect of the present disclosure, the alert definition indicates that alert instances are to be sent to a third user also. Accordingly, generating sends the alert instance to the third user at a first time instance. A second suppression duration is received at a second time instance after the first time instance. Accordingly, for each occurrence (of the pattern of interest) determined within the second suppression duration after the second time instance, the corresponding alert instance is sent to the first user but skipped for the third user.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
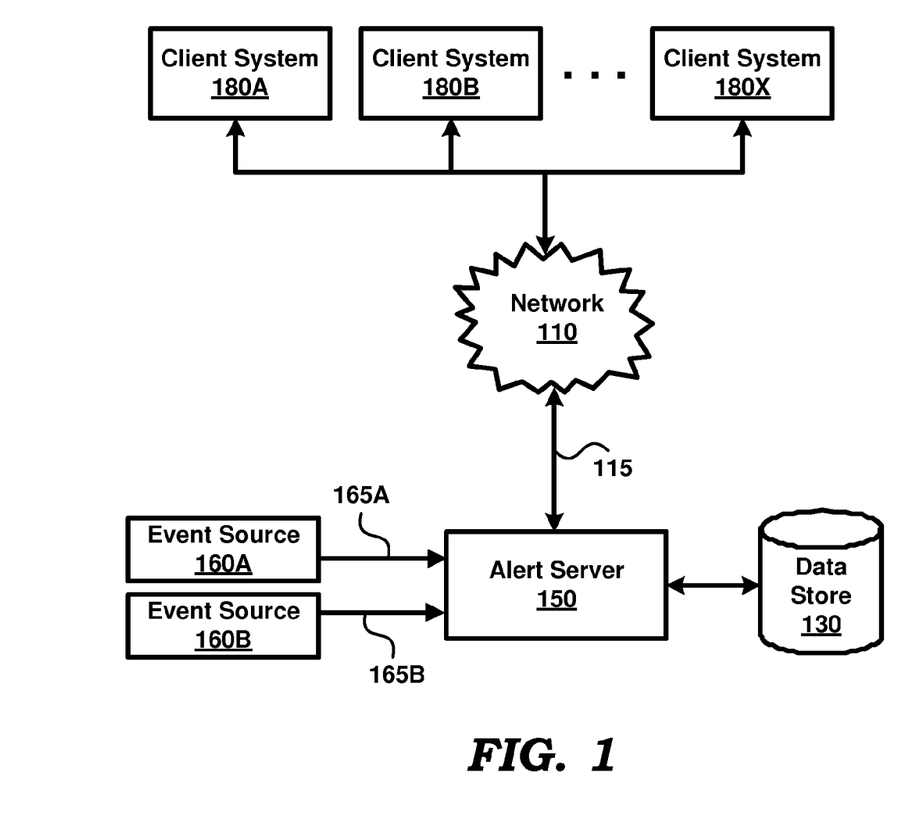
FIG. 1 is a block diagram illustrating an example environment in which several aspects of the present invention can be implemented.

FIG. 1 is a block diagram illustrating an example environment in which several aspects of the present invention can be implemented. The block diagram is shown with network 110, data store 130, alert server 150, event sources 160A-160B (generating continuous event streams 165A and 165B respectively), and client systems 180A-180X.

Merely for illustration, only representative number/type of systems is shown in the Figure. Many environments may contain many more clusters and/or systems, both in number and type, depending on the purpose for which the environment is designed. Each system of FIG. 1 is described below in further detail.

Network 110 provides connectivity between alert server 150 and client systems 180A-180X. Network 110 may be implemented using protocols such as Transmission Control Protocol (TCP) and/or Internet Protocol (IP) well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

A (IP) packet (or hereafter a "network packet") is said to be directed to a destination system when the destination IP address of the packet is set to the (IP) address of the destination system, such that the packet is eventually delivered to the destination system by network 110. When the packet contains content such as port numbers, which specifies the destination application, the packet may be said to be directed to such application as well. The destination system may be required to keep the corresponding port numbers available/open, and process the packets with the corresponding destination ports. Network 110 may be implemented using any combination of wire-based or wireless mediums.

Data store 130 represents a non-volatile storage facilitating storage and retrieval of a collection of data (for example, intermediate results forming the basis of sending the alert instances) by alert server 150. Data store 130 may be implemented using relational database technologies and therefore provide storage and retrieval of data using structured queries such as SQL (Structured Query Language). Alternatively, data store 130 may be implemented as a file store providing storage and retrieval of data in the form of one or more files organized as one or more directories, as is well known in the relevant arts.

Each of event sources 160A-160B represents a set of systems/devices, which together generate data values continuously as a respective event/data stream. Each event/data stream may be generated by one of more devices/systems contained in the corresponding source. As an illustration, in a manufacturing environment, event source 160A may include a thermometer that detects the temperature of an apparatus (not shown) every 5 minutes. The temperature readings of the thermometer may be sent to alert server 150 via path 165A as corresponding data/event stream. It may be appreciated that sources 160A-160B may send the stream of data values to alert server 150 using an appropriate network (not shown).

Alert server 150 represents a system such as a web/application server that processes continuous queries in relation to the continuous event streams 165A-165B and thereafter reports the results of processing to one or more users/recipients (for example, using client systems 180A-180X). In one embodiment, alert server 150 generates (creates and sends) user alerts based on the results of processing of such continuous event streams (165A-165B). An alert refers to notification of some pattern (either expected or anomalous) that a recipient may wish to know about.

As such, alert server 150 receives (from one of client systems 180A-180X) or is configured with alert definitions in relation to continuous event streams (such as 165A and 165B). In general, an alert type/definition specifies a condition in relation to one or more continuous event streams, upon the satisfaction of which an alert (instance) is to be generated (by alert server 150). For example, in the manufacturing environment noted above, the condition may be "when the average temperature of the apparatus (as provided by the thermometer) in a duration is higher than a threshold".

Alert server 150 accordingly processes the data values (temperatures) received in the specified continuous event stream (165A), identifies the one or more occurrences of the user specified condition (average temperature higher than a threshold) based on the results (average temperature) of processing, and accordingly generates alert instances corresponding to the identified occurrences. The generation of alerts entails sending of the alerts to one or more recipients (for example, using client systems 180A-180X) as specified in the alert definition. It should be noted that alert server 150 may generate (and also send) multiple alerts instances (each instance containing corresponding data) of the same alert type/definition at different time instances corresponding to the instances at which the condition specified in the alert definition is satisfied.

Each of client systems 110A-110X represents a system such as a personal computer, workstation, mobile station, mobile phones, computing tablets, etc., used by users to generate (client) requests for reporting the results of processing of continuous event streams (such as 165A and 165B). In one embodiment, the client requests include alert definitions according to which alerts server 150 is required to generate alerts reporting the results of processing of continuous event streams. The client requests specifying the alert definitions may be generated using appropriate user interfaces. The alert definitions may indicate the specific client systems (180A-180X) to which the alerts are to be sent.

In a prior approach, all alert instances may be sent to all recipients as specified in the alert definitions. However, it may be desirable to limit the number of alert instances sent to specific recipients. For example, the number of alert instances sent to a manager may need to be limited, while all the alert instances may need to be sent to a system administrator. In general, it may be desirable that users be provided more control with respect to alert instances.

Alert server 150, extended according to several aspects of the present disclosure, facilitates reporting results of processing of continuous event streams while addressing at least some of the above noted drawbacks/requirements, as described below with examples.

3. Reporting Results of Processing

Figure 2:
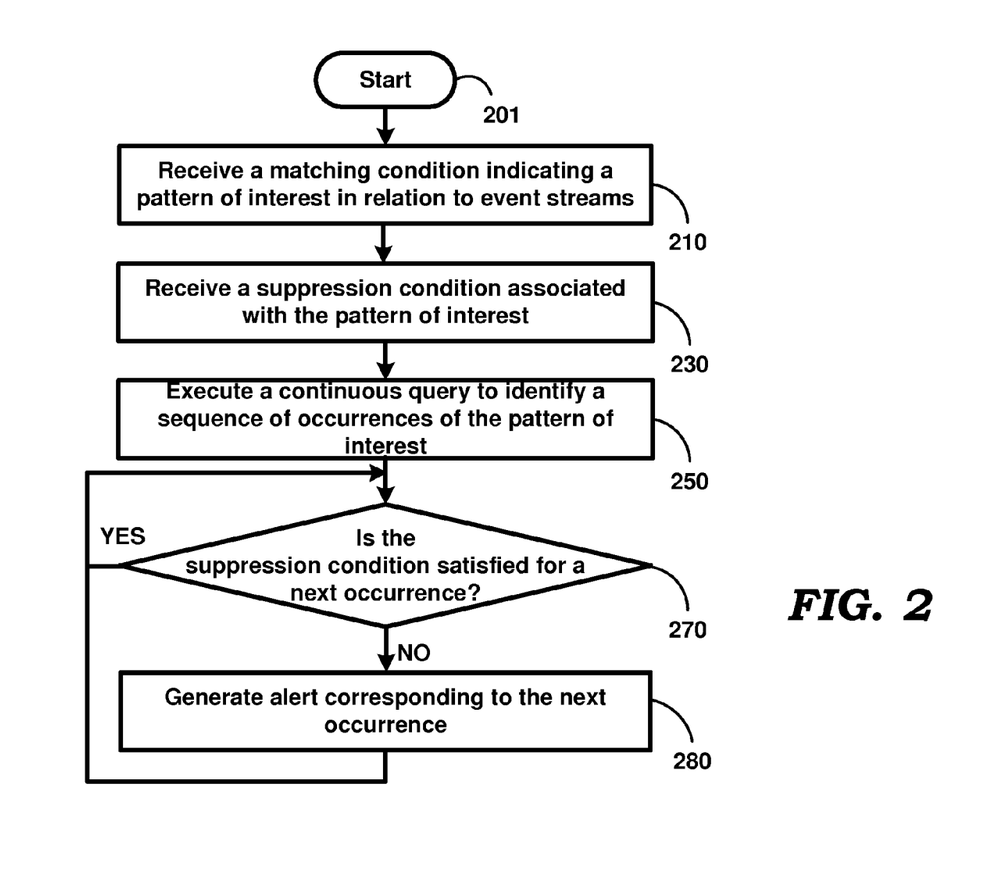
FIG. 2 is a flow chart illustrating the manner in which results of processing of continuous event streams is reported according to an aspect of the present disclosure.

FIG. 2 is a flow chart illustrating the manner in which results of processing of continuous event streams is reported according to an aspect of the present disclosure. The flowchart is described with respect to the blocks of FIG. 1, and with respect to alert server 150 in particular, merely for illustration. However, the features can be implemented in other systems and environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, alert server 150 receives a matching condition indicating a pattern of interest in relation to one or more continuous event streams. In other words, the matching condition represents a situation, the occurrences of which may be desirable to be reported as corresponding alerts. The matching condition may be received as part of an alert definition/client request from one of client systems 180A-180X.

In step 230, alert server 150 receives a suppression condition associated with the pattern of interest. A suppression condition specifies the situations, the occurrences of which are not to be reported as alerts. The suppression condition may be received along with the matching condition (as part of the alert definition) or later during operation.

In step 250, alert server 150 executes a continuous query on the specified set of event streams, to identify a sequence of occurrences of the pattern of interest. The selection criteria of the continuous query correspond to the received matching condition such that the results of execution of the query correspond to the occurrences of the pattern of interest in the event streams.

It may be readily appreciated that each occurrence may correspond to single duration as determined by the moving time window. The manner in which each occurrence is processed, is described below. The query may be formed according to languages such as Continuous Query Language (CQL), as is well known in the relevant arts.

In step 270, alert server 150 checks whether the suppression condition is satisfied for a next occurrence in the sequence. In a scenario that the suppression condition is satisfied, the alert is skipped and alert server 150 processes the next occurrence in the sequence (waiting for such occurrence, if required). Control passes to step 280 if the suppression condition is not satisfied for the next occurrence.

In step 280, alert server 150 generates an alert corresponding to the next occurrence. As noted above, the generation of an alert entails creating the alert (based on the results of processing of the continuous query) and sending (or otherwise making available) the alert to one or more users/recipients (for example, using client systems 180A-180X). Control then passes to step 270, and the corresponding steps of the flowchart may be repeated. The flowchart of FIG. 2 is depicted as being an infinite loop in view of the event streams having the property of being continuous.

Furthermore, as may be appreciated, the operation of step 250 continues in parallel to steps 270/280 such that the occurrence of the pattern of interest continues to be identified by step 250, while the occurrences are processed in accordance with steps 270/280.

By facilitating the users to specify desired combinations of matching and suppression conditions, the users are provided more control over receipt of user alerts based on results of processing of continuous event streams.

The description is continued with respect to an example implementation of alert server 150 in one embodiment.

4. Alert Server

Figure 3:
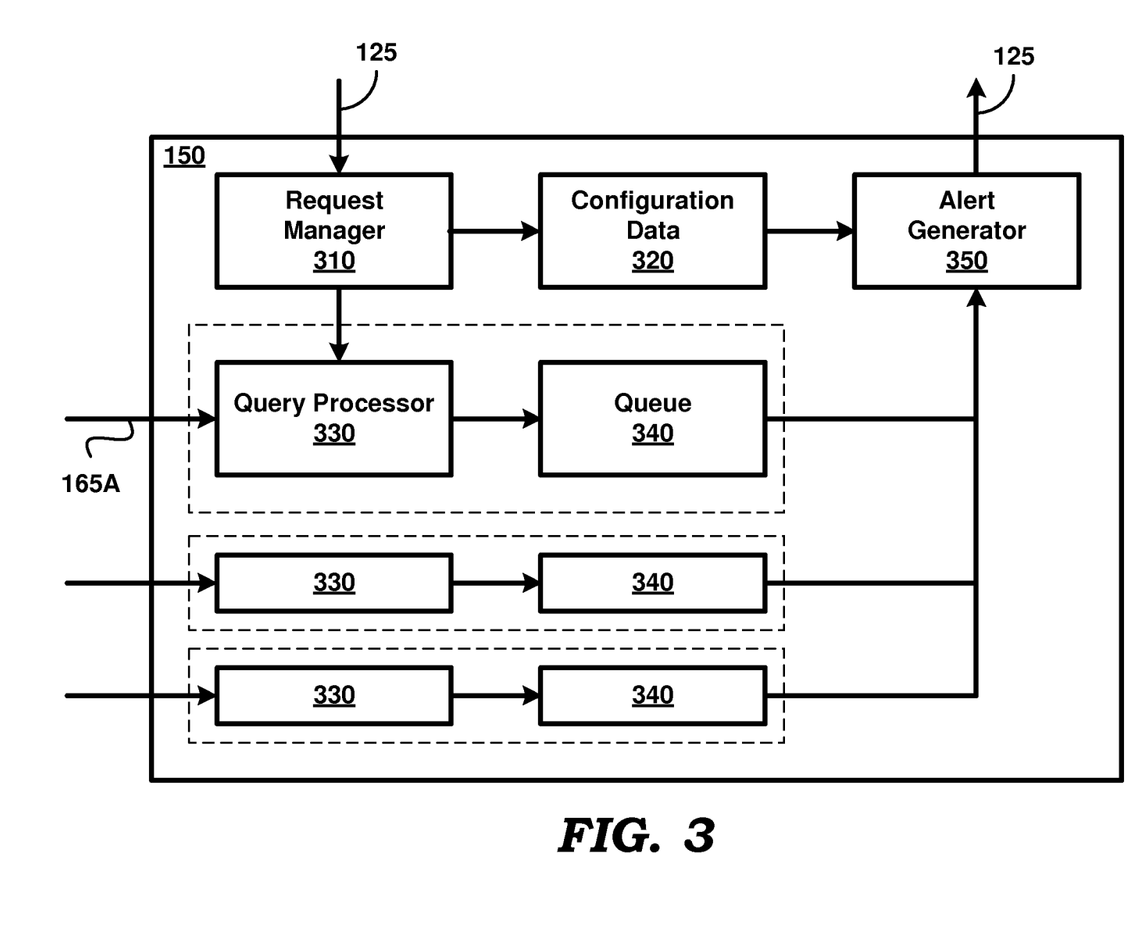
FIG. 3 is a block diagram illustrating the details of an alert server in an embodiment.

FIG. 3 is a block diagram illustrating the details of alert server 150 in an embodiment. The block diagram is shown with request manager 310, configuration data 320, query processor 330, queue 340, and alert generator 350. Each block is described in detail below.

Request manager 310 receives client requests specifying alert definitions from one of client systems 180A-180X (via path 115). Each alert definition may specify the details of the matching condition (pattern of interest), the associated suppression condition (if any), the set of continuous event streams (assumed to be only 165A, for illustration), and a set of users/recipients to whom the alerts are to be sent. As noted above, the suppression condition may be received as a separate client request later. Request manager 310 then maintains/stores the received information as part of configuration data 320.

Configuration data 320 indicates the alert definitions to be processed by alert server 150. Configuration data 420 may also specify the manner in which the alerts are to be generated, for example, the location/client systems of the recipients, the format of the alert, etc. The configuration data may be maintained in any convenient format (such as Extensible Markup Language (XML))/data structure and may be stored to/retrieved from a non-volatile memory such as data store 130 during operation of alert server 150.

In response to receiving an alert definition, request manager 310 also forms a continuous query, with the query specifying a moving time window and selection criteria. The description is continued assuming that the queries are specified using Continuous Query Language (CQL) described in detail in an article entitled "The CQL Continuous Query Language: Semantic Foundations and Query Execution" by Arvind Arasu, Shivnath Babu and Jennifer Widom, in "The VLDB Journal—The International Journal on Very Large Data Bases", Volume 15, Issue 2 (June 2006), pages 121-142 published in 2006 (ISSN number 1066-8888).

Request manager 310 may form the combination of selection criteria and moving time window to ensure that the results of execution of the continuous query are the sequence of occurrences of the pattern of interest in the continuous event streams. In other words, each occurrence of the pattern of interest corresponds to a result of execution of the continuous query during a corresponding duration determined by the moving time window.

Request manager 310 then creates and/or notifies an instance of query processor 330 to process the formed continuous query based on the stream of data values (receive via 165A). It may be appreciated that request manager 310 may initialize multiple instances of query processor 330 and queue 340 (as shown in FIG. 3) to process different queries (corresponding to different alert definitions). For illustrations, the operation of a single instance of query processor 330 and queue 240 is described in detail below.

Query processor 330 receives a query from request manager 310 and generates the various results (for respective time instances) based on the selection criteria and moving time window specified in the query. Query processor 330 then stores the results in queue 340. In an embodiment, query processor 330 generates a query plan specifying a set of operators (where each operator represents a program logic designed to execute one operation of the query) corresponding to the received query. Query processor 330 also appropriately schedules the execution of the set of operators for generating an output of the query. Query processor 330 may be implemented based on the concepts described in a paper entitled, "STREAM: The Stanford Data Stream Management System" by Arvind Arasu et al, and available from Department of Computer Science, Stanford University.

In general, query processor 330 on receiving data values from a source (such as source 160A) in the form of a continuous event stream (such as 165A) may determine whether each data value received on the event stream is to be included in or excluded from a current duration/window (as determined by the moving time window at that time instance). Query processor 330 then processes the determined data values based on the selection criteria in the query. Though the query processor is shown as processing values from a single event stream, it may be appreciated that query processor 330 may be suitably modified to process data values from multiple continuous event streams, as desired in specific environments.

Queue 340 represents a memory where data values (and corresponding time instances) forming corresponding results of execution of the query are stored. As noted above, each result/data value in queue 340 corresponds to an occurrence of the pattern of interest specified in an alert definition/client request. In other words, the data values in queue 340 represents the sequence of occurrences of the pattern of interest in the user specified set of continuous event streams. The values in queue 340 may be stored to/retrieved from a non-volatile memory such as data store 130 during execution of the query.

It may be appreciated that in the case of multiple instances, each instance of query processor 330 receives data values on multiple streams, processes the received data values based on single/multiple time windows and the selection criteria specified in the query, with the final data values in queue 340 representing the result of execution of the query at a corresponding time instance.

Alert generator 350 inspects queue 340 and generates corresponding alerts based on the results/data values (sequence of occurrences of the pattern of interest) stored in queue 340. In particular, alert generator 350 check for each result/occurrence, whether the suppression condition (maintained in configuration data 320) is satisfied for the result/occurrence. In the scenario that the suppression condition is satisfied, alert generator 350 skips the alert corresponding to the occurrence, and proceeds to process the next occurrence in the sequence/queue 340.

When the suppression condition is not satisfied, alert generator 350 creates and sends an alert instance corresponding to the occurrence to the set of users/recipients specified by the corresponding alert definition (in configuration data 320). The alert instances may be sent to one of client systems 180A-180X (via path 115) as indicated by configuration data 320. The alert instances may be sent according to any convenient format (pre-configured or user specified in the alert definition) such as email, SMS, etc. as will be apparent to one skilled in the relevant arts.

It may be appreciated that the generation of user alerts based on results of processing of continuous event streams is based on the information specified in the alert definition. The manner in which a user (such as an administrator or designer) is provided a user interface to specify the details of an alert definition/client request is described in detail below.

5. Sample User Interface for Specifying Alert Definition

Figure 4A:
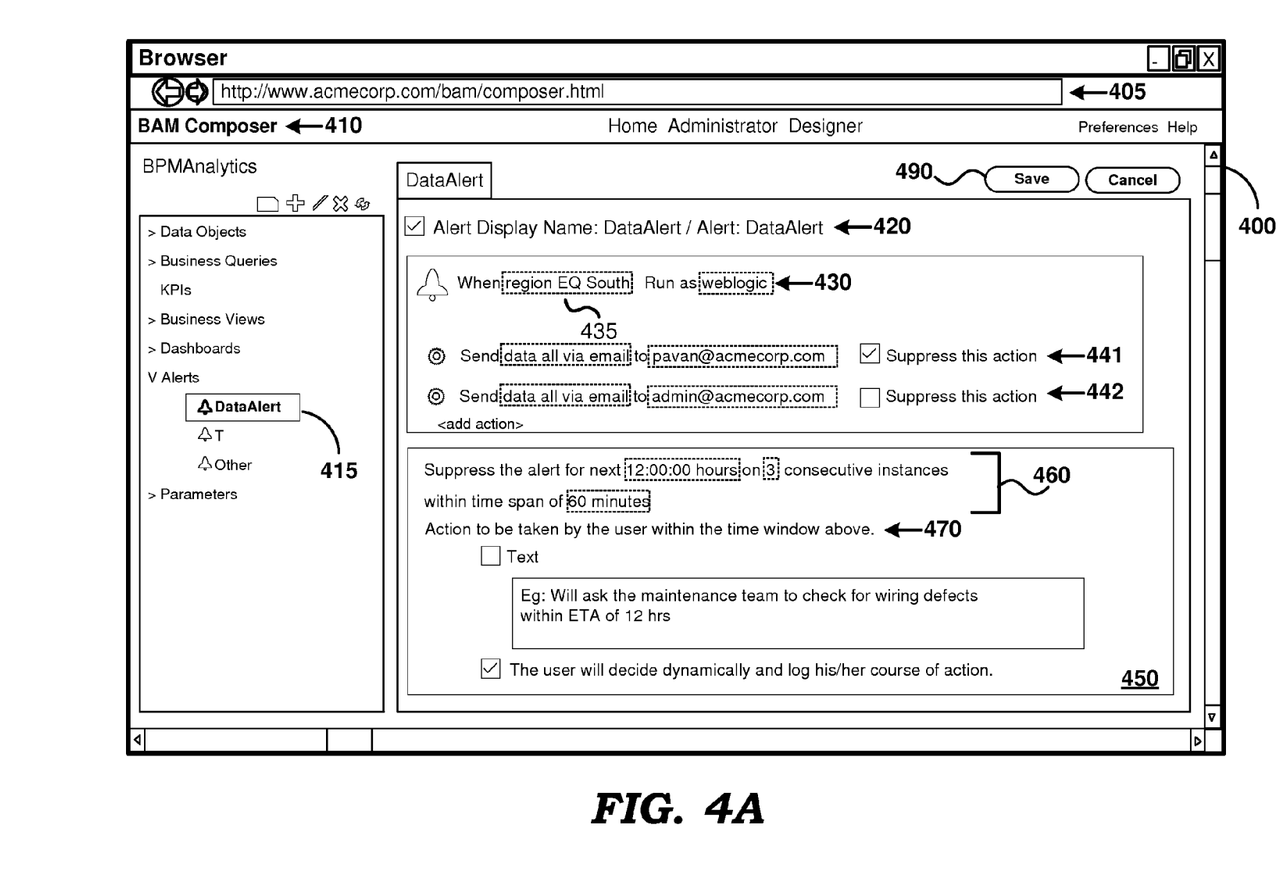
FIGS. 4A-4B together illustrates the manner in which a user is enabled to specify the details of an alert definition in one embodiment.
Figure 4B:
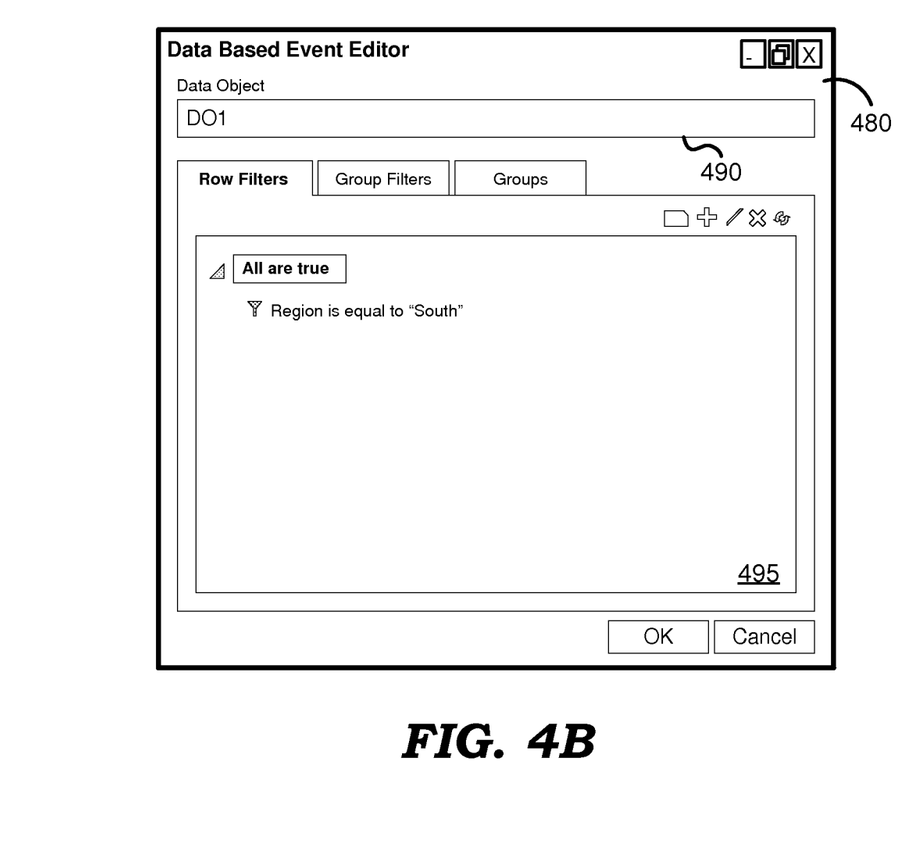

FIGS. 4A-4B together illustrates the manner in which a user is enabled to specify the details of an alert definition in one embodiment. Each of the Figures is described in detail below.

Display area 400 of FIG. 4A (and display area 480 of FIG. 4B) depicts a portion of a user interface provided on a display unit (not shown in FIG. 1) associated with one of client systems 180A-180X (assumed to be 180A for illustration). In one embodiment, each of display areas 400 and 480 corresponds to a webpage accessed by the users using a browser in response to sending a request (including an identifier of the webpage, as indicated by the text in display area 405 for the web page shown in display area 400) from client system 180A to alert server 150 (in particular, request manager 310). Each web page is received from request manager 310 prior to being displayed (using the browser) on the display unit.

Display area 410 indicates that the web page displayed is provided by a BAM (Business Activity Monitoring) composer application. As is well known, a BAM application facilitates the aggregation, analysis, and presentation of real-time information about activities inside a business organization and involving the customers and partners of the business organization. In other words, each enterprise application executing in a business organization may be viewed as a event source (160A/160B) that generates a continuous event stream of the activities performed (automatically/in response to user inputs) by the enterprise application. Oracle Business Activity Monitoring(BAM) version 12c (available from Oracle Corporation) is an example BAM application, which can be extended in accordance with the features described herein.

Display area 415 indicates that a user (an administrator or designer) is currently specifying the definition of an alert in relation to one or more continuous event streams, with display area 420 indicating that the name of the alert as being "DataAlert".

Display area 430 specifies the matching condition/pattern of interest to be used for generation of the alerts. Display area 430 is shown providing a pre-defined template (a fixed combination of words and fields), with the portions shown in dotted boundaries (fields) being editable by the user. Thus, display area 430 is shown containing two fields, a first field (435) for specifying the matching condition/pattern of interest along with the specific continuous event streams and a second field for specifying the application supporting the specific continuous event streams (the value "weblogic" indicating that the streams are supported by the BAM application). The user may click/select the desired field and specify the desired condition/other information appropriate for the selected field. The manner in which a user edits a field is described in detail below.

Referring to FIG. 4B, display area 480 depicts a portion of a user interface (such as a web page) displayed in response to the user selecting field 435 in display area 430 of FIG. 4A. Display area 490 enables the user to select the desired continuous event stream/data object ("DO1") in relation to which the alert is defined, while display area 495 enables the user to specify the desired pattern of interest as "region is equal to 'South'" where region is an attribute of the continuous event stream DO1. The user may select the "OK" button to save/store the specified information.

Referring again to FIG. 4A, field 435 is shown specifying the pattern of interest "region EQ South" (EQ being the "equal to" operator) in response to the user specifying the information as shown in display area 480 of FIG. 4B. The description is continued assuming that user interfaces (not shown) similar to display area 480 are provided to the user for specifying the details of the other fields (shown in dotted boundaries) in display area 400.

Each of display areas/lines 441 and 442 specifies the specific actions to be performed when an occurrence of the matching condition is determined Again, templates are shown provided to the user, with corresponding fields being editable. Lines 441 and 442 accordingly indicate that email communications are to be sent to "pavan@acmecorp.com" and "admin@acmecorp.com" for each occurrence of the pattern of interest in the continuous event stream DO1. It may be appreciated that the email addresses noted here may correspond to the user designing the alert definition or to other users who may wish to receive such alerts.

Furthermore, for each of the lines/actions specified for the alert, a checkbox (with the text "Suppress this action") is also shown provided. The user may click/select the checkbox to indicate that a suppression condition is to be specified for the action. It may be observed that only the checkbox in line 441 is shown selected, to indicate that the suppression condition is associated with the action in line 441 (and not line 442).

Display area 450 facilitates a user to specify a suppression condition associated with any of the actions (such as lines 441 and 442) specified for the alert. Display area 450 is shown as specifying the suppression condition for action/line 441. Though not shown, display area 450 may be suitably updated in response to the user selecting (the checkbox in) the other actions/lines (such as 442).

Display area 460 provides a template for suppressing a repetitive alert, with the user specifying that in the scenario that the alert "DataAlert" is repeated 3 times within a time span of 60 minutes, all subsequent alert instances (of the "DataAlert") in the next 12 hours is to be suppressed. In other words, the user wishes to receive an alert when an occurrence of the pattern of interest is determined (by alert server 150), but would like to suppress the alert if the number of instances of the alert is too frequent.

Display area 480 indicates that the action to be taken by the user during the time window (12 hours) that the alerts are not received. The designer/administrator may select the "Text" checkbox and specify a text to be sent to the user during the time window. Alternatively, the other checkbox may be selected to indicate that the user will decide dynamically and will log his/her course of action.

After specifying the desired matching condition (in 430), the suppression condition (in 450), the set of continuous event streams (here, DO1) and the set of users/recipients to whom alerts are to be sent (in lines 441-442), the user may click/select "Save" button 490 to submit the corresponding alert definition/client request to alert server 150.

It may be appreciated that the alert definition specified using FIG. 4 a timing pattern for prior alert instances (3 alert instances in 60 minutes) and a suppression duration (12 hours). Accordingly, alert server 150 skips the alert instance for an occurrence if the timing of alert instances prior to the occurrence satisfies the timing pattern and the timing of the occurrence is within the suppression duration.

Furthermore, it may be observed that the alert instances are indicated to be sent to multiple users, while the suppression condition is associated with only a specific one of the users. Thus, during the suppression duration, the corresponding alert instance is sent to all the other users, but is skipped for the specific user.

In general, a user/designer may specify a timing pattern in the form of a threshold number (3 in FIG. 4) of prior alert instances, in a prior duration (60 minutes), wherein subsequent alert instances are suppressed for the suppression duration (12 hours) upon generation of the threshold number of prior alert instances in the prior duration thereby avoiding repetition of the alert instances beyond the threshold number in a duration (13 hours) of a sum of the prior duration and the suppression duration.

Thus, a user may specify a desired alert definition using the user interface of FIG. 4, and submit the alert definition to alert server 150. The manner in which the various blocks of alert server 150 (as shown in FIG. 3) operate to send alerts (and also to skip alerts) for the alert definition shown in FIG. 4 is described below with examples.

6. Example Operation

Figure 5:
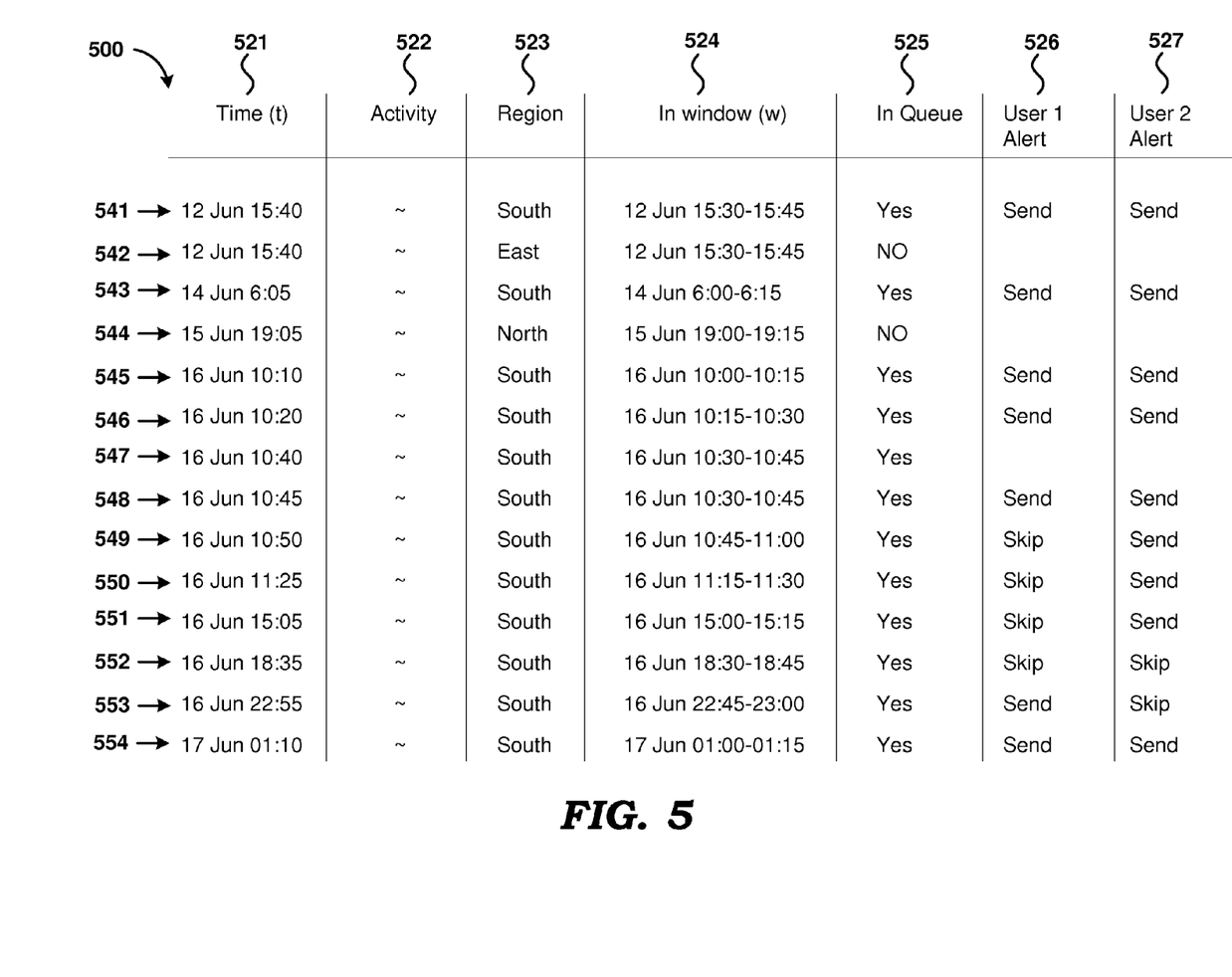
FIG. 5 depicts the manner in which user alerts based on results of processing of continuous event streams is generated in one embodiment.

FIG. 5 depicts the manner in which user alerts based on results of processing of continuous event streams is generated in one embodiment. In particular, the generation of user alerts for the alert definition/client request submitted using the interface of FIG. 4 is described in detail below.

In response to the user submitting the client request (by selecting button 490), request manager 310 in alert server 150 stores the user specified information of FIG. 4 in configuration data 320, and thereafter generates a CQL query with a selection criteria and a moving time window. An example CQL query that may be generated for identifying the occurrences of the alerts as defined in FIG. 4 is shown below:

SELECT*
FROM DO1 [RANGE 15 minutes SLIDE 15 minutes]
WHERE DO1.Region="South";

wherein the words "SELECT", "FROM", "RANGE", "SLIDE", "WHERE" and "minutes" and the symbols "*", "[", "]" and ";" represent constructs having a pre-defined meaning in CQL.

As is well known, the "FROM" clause indicates the names (here, DO1) of the continuous event stream, the "SELECT" clause indicates the names of the specific attributes to be retrieved from the continuous event stream DO1 (with * indicating that all the attributes are to be retrieved), and the "WHERE" clause specifies the selection criteria that has to be satisfied by the data values in the continuous event stream. The "RANGE" clause indicates the width of the moving time window (here 15 minutes), while the "SLIDE" clause indicates the time intervals at which the outputs are to be generated (in other words, the duration by which the time window is to be moved after generating an output, here 15 minutes).

Thus, the above CQL query indicates that all the activities received on continuous event stream DO1 that have the attribute "Region" equal to "South" in a time window of 15 minutes is to be output as a result of processing/execution of the query. The time window is then to be moved by 15 minutes, and the result to be generated for the moving window iteratively. Thus, assuming the query is initially executed at 10:15 (according to 24:00 hour format), the result of processing is the set of matching activities (having "Region" equal to "South") in the duration 10:00-10:15. The result is also generated at 10:30, 10:45, 11:00, etc. to output the matching activities in the respective durations of 10:15-10:30, 10:30-10:45, 10:45-11:00, etc.

It may be observed that the combination of selection criteria and moving time window is formed to ensure that the results of execution of the CQL query noted above are the sequence of occurrences of the pattern of interest (region EQ South) in the continuous event stream (DO1). Request manager 310 then initializes an instance of query processor 330 to process a CQL query formed for the user specified pattern of interest. The manner in which query processor 330 executes the above noted CQL query is described in detail below.

For illustration, the processing of the data values received in the continuous event stream (DO1) in shown in the form of table 500. However, the processing may be performed using data structures such as trees, lists, etc. and/or using other formats, as will be apparent to one skilled in the relevant arts by reading the disclosure herein.

Table 500 depicts the manner in which the alerts are generated based on results of processing of continuous event streams. Column 521 ("Time (t)") indicates time instances at which corresponding data values are received in the continuous event stream DO1, while columns 522 ("Activity") and 523 ("Region") indicate portions of the data values received. For convenience, only the portions relevant to the query are shown (values in column 523), while the portions that are not relevant are represented by the text "~" (values in column 522).

Column 524 ("In window (w)") indicates the specific current duration/window in which the received data values are processed. It should be noted that all the time instances are specified according to the "24:00" format for convenience. Column 525 ("In Queue") indicates whether the data values are included as the result of processing of the query/occurrence of the pattern of interest. Columns 526 ("User 1 Alert") and 527 ("User 2 Alert") indicates whether alerts are generated for the respective users "pavan" and "admin" shown in lines 441 and 442 of FIG. 4. The value "Send" in columns 526/527 indicates that the alert is generated and sent to that user, while the value "Skip" indicates that the alert is skipped (for the corresponding occurrence/result of processing) for that user.

Each of rows 541-554 indicates the details of a corresponding data value received on continuous event stream DO1 and the manner of processing the data value (generating or skipping the alert). It may be observed in rows 541 and 542, that though both the data values are included in the same window (12 June 15:30-15:45), only the data value in row 541 is output as a result of processing of the query to the queue in view of the region being equal to "South" (as specified by the "WHERE" clause in the above noted CQL query). As noted above, the results of processing are added to the queue at the end time of corresponding window (w), for example, at 15:45 for the window 15:30-15:45 indicated in row 541. In response to the occurrence in row 541, an alert instance is generated (and sent) for both users User 1 and User 2. It may be appreciated that that suppression condition is not satisfied for row 541, as the timing pattern specified in the suppression condition is not present for the prior alert instances.

Similarly, alerts are also generated for the occurrence in row 543, while no alerts are generated for the data value in row 544 in view of no result in the queue. For conciseness, only the processing of the various data values matching the selection criteria (and which accordingly would be included in the queue/results of processing) are noted in the subsequent rows. It may be appreciated that other data values having the region attribute not equal to "South" would be ignored by query processor 330, similar to rows 542 and 544.

With respect to rows 545-549, it may be observed that the data values are received in a short duration (between 10:10 and 10:50 on June 16). Accordingly, alerts are shown generated for each of the windows 10:00-10:15 (row 545), 10:15-10:30 (reporting both the data values in rows 546 and 547) and 10:30-10:45 (row 548). Accordingly, in response to the occurrence in row 549, alert generator 350 determines that the timing pattern (3 alert instances in the 60 minutes) specified in the suppression condition (of display area 450) is present, and accordingly skips the alerts to User 1 for the next 12 hours (suppression duration).

Thus, for the data values in rows 549-552, alert generator 350 skips the alerts for User 1 for each of the occurrences of the pattern of interest in the continuous event stream DO1. In row 553, alert generator 350 generates the alert for User1 in view of the expiry of the suppression duration (12 hours) from the timing (10:45) of the last alert (in row 548). It may be observed that during the suppression duration (from 10:45 to 22:45 on 16 June), alert generator 350 generates alerts for User 2, as indicated in rows 549-551.

An aspect of the present disclosure facilitates a user to send a second suppression duration after receiving one or more alerts from alert server 150, indicating that the subsequent alert instances within the second suppression duration are to be skipped for the user. The description is continued assuming that such as second suppression duration of 8 hours is received from User 2 at 16 June 16:00 (after receiving the alert in row 551).

Accordingly, in rows 552-553, alert generator 350 skips the alerts for User 2 for each of the occurrences of the pattern of interest in the continuous event stream DO1. In row 554, alert generator 350 generates alerts for both users User 1 and User 2 since the suppression condition specified in the alert definition (shown in FIG. 4) is not satisfied for User 1 and due to the expiry of the second suppression duration for User 2.

It should be appreciated that the features described above can be implemented in various embodiments as a desired combination of one or more of hardware, executable modules, and firmware. The description is continued with respect to an embodiment in which various features are operative when executable modules are executed.

7. Digital Processing System

Figure 6:
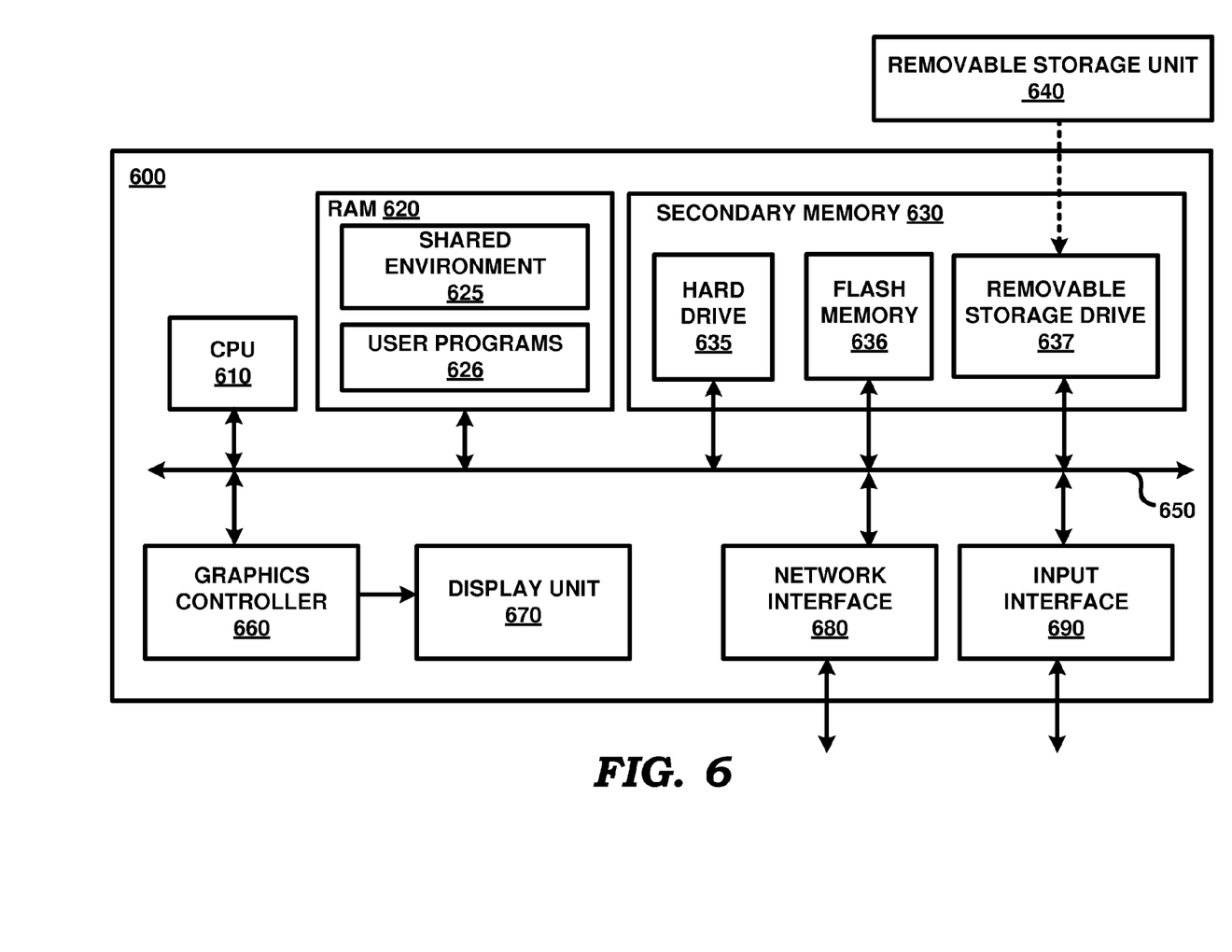
FIG. 6 is a block diagram illustrating the details of a digital processing system in which various aspects of the present disclosure are operative by execution of appropriate executable modules.

FIG. 6 is a block diagram illustrating the details of digital processing system 600 in which various aspects of the present disclosure are operative by execution of appropriate executable modules. Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The blocks of FIG. 6 are described below in further detail.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit. RAM 620 may receive instructions from secondary memory 630 using communication path 650. RAM 620 is shown currently containing software instructions constituting shared environment 625 and user programs 626. Shared environment 625 includes operating systems, device drivers, virtual machines, etc., which provide a (common) run time environment for execution of user programs 626.

Graphics controller 660 generates display signals (e.g., in RGB format) to display unit 670 based on data/instructions received from CPU 610. Display unit 670 contains a display screen to display the images defined by the display signals (for example, the portions of the user interface of FIG. 4). Input interface 690 may correspond to a keyboard and a pointing device (e.g., touch-pad, mouse) and may be used to provide inputs (for example, the details of the user request provided using the user interface of FIG. 4). Network interface 680 provides connectivity to a network and may be used to communicate with other systems (such as the systems of FIG. 1) connected to the network.

Secondary memory 630 may contain hard drive 635, flash memory 636, and removable storage drive 637. Secondary memory 630 may store the data (for example, data values received in a continuous event stream such as the values shown in FIG. 5) and software instructions (for implementing the steps of FIG. 2, described above), which enable digital processing system 600 to provide several features in accordance with the present disclosure. The code/instructions and ASCII data stored in secondary memory 630 may either be copied to RAM 620 prior to execution by CPU 610 for higher execution speeds, or may be directly executed by CPU 610.

Some or all of the data and instructions may be provided on removable storage unit 640, and the data and instructions may be read and provided by removable storage drive 637 to CPU 610. Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 650. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

8. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of reporting results of processing of continuous event streams, said method being executed by one or more processors, said method comprising:

receiving a matching condition indicating a pattern of interest as a part of an alert definition in relation to a set of continuous event streams, wherein occurrences of said pattern of interest are desirable to be reported as corresponding alert instances;

receiving a suppression condition associated with said pattern of interest, wherein said suppression condition indicates the specific occurrences of said pattern of interest that are not to be reported as corresponding alert instances;

determining, in said set of continuous event streams, a sequence of occurrences of said pattern of interest; and for each occurrence in said sequence of occurrences, generating an alert instance corresponding to the occurrence only if said suppression condition is not satisfied for the occurrence.

2. The method of claim 1, wherein said determining comprises:
obtaining a sequence of results of execution of a continuous query on said set of continuous event streams, said continuous query indicating a selection criteria and a moving time window, said selection criteria corresponding to said matching condition,
wherein said each of said sequence of results is obtained based on data values of said set of continuous event streams in a corresponding duration determined by said moving time window; and
identifying each of said sequence of results as corresponding to one of said sequence of occurrences of said pattern of interest in said set of continuous event streams,
wherein said generating generates said alert instance corresponding to each result only if said suppression condition is not satisfied for the result.

3. The method of claim 2, wherein said generating skips the alert instance corresponding to a result if said suppression condition is satisfied for the result.

4. The method of claim 3, wherein said suppression condition specifies a timing pattern for prior alert instances and a suppression duration,
wherein said generating, for each occurrence, skips the alert instance for the occurrence if the timing of alert instances prior to the occurrence satisfies said timing pattern and the timing of the occurrence is within said suppression duration.

5. The method of claim 4, wherein said timing pattern is specified in the form of a threshold number of prior alert instances in a prior duration, wherein subsequent alert instances are suppressed for said suppression duration upon generation of the threshold number of prior alert instances in said prior duration thereby avoiding repetition of the alert instances beyond said threshold number in a duration of a sum of said prior duration and said suppression duration.

6. The method of claim 4, wherein said alert definition indicates that alert instances are to be sent to a first user and a second user, wherein said suppression condition is specified associated with said second user but not said first user,
wherein for each occurrence determined within said suppression duration, the corresponding alert instance is sent to said first user, but is skipped for said second user.

7. The method of claim 6, wherein said alert definition indicates that alert instances are to be sent to a third user also, wherein said generating sends said alert instance to said third user at a first time instance,
wherein a second suppression duration is received at a second time instance after said first time instance,
wherein, for each occurrence determined within said second suppression duration after said second time instance, the corresponding alert instance is sent to said first user but skipped for said third user.

8. The method of claim 7, wherein said continuous query is specified according to CQL (continuous query language).

9. A non-transitory machine readable medium storing one or more sequences of instructions for enabling a system to report results of processing of continuous event streams, wherein execution of said one or more instructions by one or more processors contained in said system enables said system to perform the actions of:
receiving a matching condition indicating a pattern of interest as a part of an alert definition in relation to a set of continuous event streams, wherein occurrences of said pattern of interest are desirable to be reported as corresponding alert instances;
receiving a suppression condition associated with said pattern of interest, wherein said suppression condition indicates the specific occurrences of said pattern of interest that are not to be reported as corresponding alert instances;
determining, in said set of continuous event streams, a sequence of occurrences of said pattern of interest; and
for each occurrence in said sequence of occurrences, generating an alert instance corresponding to the occurrence only if said suppression condition is not satisfied for the occurrence.

10. The machine readable medium of claim 9, wherein said determining comprises one or more instructions for:
obtaining a sequence of results of execution of a continuous query on said set of continuous event streams, said continuous query indicating a selection criteria and a moving time window, said selection criteria corresponding to said matching condition,
wherein said each of said sequence of results is obtained based on data values of said set of continuous event streams in a corresponding duration determined by said moving time window; and
identifying each of said sequence of results as corresponding to one of said sequence of occurrences of said pattern of interest in said set of continuous event streams,
wherein said generating generates said alert instance corresponding to each result only if said suppression condition is not satisfied for the result.

11. The machine readable medium of claim 10, wherein said generating skips the alert instance corresponding to a result if said suppression condition is satisfied for the result.

12. The machine readable medium of claim 11, wherein said suppression condition specifies a timing pattern for prior alert instances and a suppression duration,
wherein said generating, for each occurrence, skips the alert instance for the occurrence if the timing of alert instances prior to the occurrence satisfies said timing pattern and the timing of the occurrence is within said suppression duration.

13. The machine readable medium of claim 12, wherein said timing pattern is specified in the form of a threshold number of prior alert instances in a prior duration, wherein subsequent alert instances are suppressed for said suppression duration upon generation of the threshold number of prior alert instances in said prior duration thereby avoiding repetition of the alert instances beyond said threshold number in a duration of a sum of said prior duration and said suppression duration.

14. The machine readable medium of claim 12, wherein said alert definition indicates that alert instances are to be sent to a first user and a second user, wherein said suppression condition is specified associated with said second user but not said first user,
wherein for each occurrence determined within said suppression duration, the corresponding alert instance is sent to said first user, but is skipped for said second user.

15. The machine readable medium of claim 14, wherein said alert definition indicates that alert instances are to be sent to a third user also, wherein said generating sends said alert instance to said third user at a first time instance,
wherein a second suppression duration is received at a second time instance after said first time instance,
wherein, for each occurrence determined within said second suppression duration after said second time instance, the corresponding alert instance is sent to said first user but skipped for said third user.

16. A digital processing system comprising:
a processor;
a random access memory (RAM);
a machine readable medium to store one or more instructions, which when retrieved into said RAM and executed by said processor causes said digital processing system to report results of processing of continuous event streams, said digital processing system performing the actions of:
receiving a matching condition indicating a pattern of interest as a part of an alert definition in relation to a set of continuous event streams, wherein occurrences of said pattern of interest are desirable to be reported as corresponding alert instances;
receiving a suppression condition associated with said pattern of interest, wherein said suppression condition indicates the specific occurrences of said pattern of interest that are not to be reported as corresponding alert instances;
determining, in said set of continuous event streams, a sequence of occurrences of said pattern of interest; and
for each occurrence in said sequence of occurrences, generating an alert instance corresponding to the occurrence only if said suppression condition is not satisfied for the occurrence.

17. The digital processing system of claim 16, wherein said determining comprises:
obtaining a sequence of results of execution of a continuous query on said set of continuous event streams, said continuous query indicating a selection criteria and a moving time window, said selection criteria corresponding to said matching condition,
wherein said each of said sequence of results is obtained based on data values of said set of continuous event streams in a corresponding duration determined by said moving time window; and
identifying each of said sequence of results as corresponding to one of said sequence of occurrences of said pattern of interest in said set of continuous event streams,
wherein said generating generates said alert instance corresponding to each result only if said suppression condition is not satisfied for the result.

18. The digital processing system of claim 17, wherein said generating skips the alert instance corresponding to a result if said suppression condition is satisfied for the result.

19. The digital processing system of claim 18, wherein said suppression condition specifies a timing pattern for prior alert instances and a suppression duration,
wherein said generating, for each occurrence, skips the alert instance for the occurrence if the timing of alert instances prior to the occurrence satisfies said timing pattern and the timing of the occurrence is within said suppression duration.

20. The digital processing system of claim 19, wherein said timing pattern is specified in the form of a threshold number of prior alert instances in a prior duration, wherein subsequent alert instances are suppressed for said suppression duration upon generation of the threshold number of prior alert instances in said prior duration thereby avoiding repetition of the alert instances beyond said threshold number in a duration of a sum of said prior duration and said suppression duration.

* * * * *